(12) United States Patent
Kidambi et al.

(10) Patent No.: US 8,537,860 B2
(45) Date of Patent: *Sep. 17, 2013

(54) APPARATUS FOR SWITCHING TRAFFIC BETWEEN VIRTUAL MACHINES

(75) Inventors: Jayakrishna Kidambi, San Jose, CA (US); Vijoy Pandey, San Jose, CA (US); Mike Browne, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 599 days.

This patent is subject to a terminal disclaimer.

(21) Appl. No.: 12/611,152

(22) Filed: Nov. 3, 2009

(65) Prior Publication Data

US 2011/0103389 A1   May 5, 2011

(51) Int. Cl.
| | |
|---|---|
| *H04J 3/24* | (2006.01) |
| *H04L 12/28* | (2006.01) |
| *H04L 12/54* | (2006.01) |
| *G06F 15/167* | (2006.01) |
| *G06F 15/16* | (2006.01) |
| *G06F 15/173* | (2006.01) |

(52) U.S. Cl.
USPC ........... 370/474; 370/392; 370/429; 709/213; 709/236; 709/238

(58) Field of Classification Search
None
See application file for complete search history.

(56) References Cited

U.S. PATENT DOCUMENTS

| | | | | |
|---|---|---|---|---|
| 4,755,986 | A * | 7/1988 | Hirata | 370/392 |
| 7,966,620 | B2 * | 6/2011 | Mundkur et al. | 719/319 |
| 2004/0013117 | A1 * | 1/2004 | Hendel et al. | 370/394 |
| 2008/0117909 | A1 | 5/2008 | Johnson | |
| 2008/0240122 | A1 * | 10/2008 | Richardson et al. | 370/401 |
| 2008/0263544 | A1 * | 10/2008 | Amano et al. | 718/1 |
| 2009/0083445 | A1 * | 3/2009 | Ganga | 709/250 |
| 2009/0100204 | A1 | 4/2009 | Boyd et al. | |
| 2009/0133016 | A1 | 5/2009 | Brown et al. | |
| 2009/0154469 | A1 | 6/2009 | Winter | |

OTHER PUBLICATIONS

Congdon, "Virtual Ethernet Port Aggregator Standards Body Discussion", Nov. 10, 2008, 26 pages.
Ganga et al., "Virtual Ethernet Bridging in Server end stations", Sep. 16, 2008, 12 pages.
"IEEE Standard for Local and Metropolitan Area Networks—Virtual Bridged Local Area Networks—Amendment", Jul. 16, 2008, pp. 7.
Ganga, "Virtual Bridging consideratioons for Server perspective", Jan. 15, 2009, 11 pages.

* cited by examiner

*Primary Examiner* — Faruk Hamza
*Assistant Examiner* — Cassandra Decker
(74) *Attorney, Agent, or Firm* — Guerin & Rodriguez, LLP

(57) ABSTRACT

Systems for switching traffic include a physical machine running source and destination virtual machines (VMs). The source VM issues a data unit addressed to the destination VM. The physical machine has a physical network interface in communication with the VMs. The physical network interface transmits a sub-packet, which includes a partial portion of the data unit, over a network while a majority portion of the data unit remains at the physical machine. A network switch on the network receives the sub-packet transmitted by the physical network interface. The network switch performs one or more OSI Layer 2 through Layer 7 switching functions on the sub-packet and returns that sub-packet to the physical network interface. The physical network interface identifies the data unit stored in the memory in response to the sub-packet returned from the network switch and forwards the identified data unit to the destination VM.

15 Claims, 6 Drawing Sheets

APPARATUS FOR SWITCHING TRAFFIC BETWEEN VIRTUAL MACHINES

FIELD OF THE INVENTION

The invention relates generally to data centers and data processing. More particularly, the invention relates to switching virtual machine-to-virtual machine traffic externally on a switch device.

BACKGROUND

Server virtualization in data centers is becoming widespread. In general, server virtualization describes a software abstraction that separates a physical resource and its use from the underlying physical machine. Most physical resources can be abstracted and provisioned as virtualized entities. Some examples of virtualized entities include the central processing unit (CPU), network input/output (I/O), and storage I/O.

Virtual machines (VMs), which are a virtualization of a physical machine and its hardware components, play a central role in virtualization. A virtual machine typically includes a virtual processor, virtual system memory, virtual storage, and various virtual devices. A single physical machine can host a plurality of virtual machines. Guest operating systems execute on the virtual machines, and function as though executing on real hardware.

A layer of software provides an interface between the virtual machines resident on a physical machine and the underlying physical hardware. Commonly referred to as a hypervisor or virtual machine monitor (VMM), this interface multiplexes access to the hardware among the virtual machines, guaranteeing to the various virtual machines safe and isolated use of the physical resources of the machine, such as the CPU, memory, storage, and network bandwidth.

Typical server virtualization implementations have the virtual machines share the physical network interface, network adapter, or network interface card (NIC) of the physical machine for performing external network I/O operations. The hypervisor typically provides a software-based virtual switched network (called a vswitch) that provides interconnectivity among the virtual machines on a single physical machine. The vswitch interfaces between the physical network interface of the physical machine and the virtual NICs (vNICs) of the virtual machines, each virtual machine having one or more associated vNICs. In general, each vNIC operates like a physical network interface, being assigned a MAC (Media Access Control) address that is typically different from that of the physical network interface. The vswitch performs the forwarding of packets to and from the various virtual machines and the physical network interface.

Early efforts to reduce the burden on the vswitch (hence freeing up valuable CPU cycles on the hypervisor) and improve network I/O performance have produced network I/O hardware technology such as Virtual Machine Direct Queues (VMDq), which is an adaptation of the multi-queue NIC concept for virtual networking, where each queue pair (transmit and receive) is dedicated to a virtual machine. The NIC places outgoing packets from a given virtual machine into the transmit queue of that virtual machine and incoming packets addressed to the given virtual machine into its receive queue. The direct assignment of such queues to each virtual machine thus simplifies the handling of outgoing and incoming traffic, and avoids buffer copies, which engage CPU cycles.

Ongoing industry efforts are seeking to improve the performance of switching traffic between virtual machines within a single hypervisor by bypassing the hypervisor's vswitch. For example, PCI SR-IOV (Peripheral Component Interconnect Single-Root I/O Virtualization) technology partitions a single network interface into multiple virtual functions. Virtual machines can directly access the physical resource (i.e., the network interface) through the virtual functions without having to rely on the hypervisor for control or data operations. To bypass the vswitch in this fashion, traffic switching between VMs occurs either in the physical network interface (e.g., the NIC) or in an external switch device (e.g., a Layer-2 edge switch). One proposed technique, called VEB (Virtual Ethernet Bridging), performs intra-hypervisor, VM-to-VM traffic switching within the physical network interface. Another proposed technique, called VEPA (Virtual Ethernet Port Aggregator), switches the intra-hypervisor VM-to-VM traffic at an edge network device, the idea being that full switching functionality in NIC hardware would be technically challenging and expensive to implement, compared to the incremental change required to implement VEPA. Yet another proposed technique, called Port Extenders, switches such VM-to-VM traffic several network devices removed from the hypervisor, for example, at a core network switch of a hierarchical network infrastructure.

SUMMARY

In one aspect, the invention features a data center, comprising a physical machine running a plurality of virtual machines including a source virtual machine and a destination virtual machine. The physical machine has a physical network interface in communication with the plurality of virtual machines and with a network. The source virtual machine issues a data unit addressed to the destination virtual machine. The physical network interface transmits a partial portion of the data unit over the network while a majority portion of the data unit remains stored in memory at the physical machine. The data center also includes a network switch on the network. The network switch has a physical port that receives the partial portion of the data unit transmitted by the physical network interface. The network switch returns that partial portion of the data unit to the physical network interface through the same physical port, wherein the physical network interface identifies the data unit stored in the memory in response to the partial portion returned from the network switch and forwards the identified data unit to the destination virtual machine.

In another aspect, the invention features a data center, comprising a physical machine running a plurality of virtual machines including a source virtual machine and a destination virtual machine. The physical machine has a physical network interface in communication with the plurality of virtual machines and with a network. The source virtual machine issues a data unit addressed to the destination virtual machine. The physical network interface transmits a partial portion of the data unit over the network while a majority portion of the data unit remains stored in memory at the physical machine. The data center also includes a network switch on the network. The network switch has a physical port that receives the partial portion of the data unit transmitted by the physical network interface. The network switch returns that partial portion of the data unit to the physical network interface through the same physical port, wherein the physical network interface identifies the data unit stored in the memory in response to the partial portion returned from the network switch and forwards the identified data unit to the destination virtual machine.

In still another aspect, the invention features a physical network interface, comprising a PCI (Peripheral Component Interconnect) port for receiving a data unit addressed by a source virtual machine on a physical machine to a destination virtual machine on the same physical machine. A processing element generates a sub-packet containing a partial portion of the data unit addressed by the source virtual machine to the destination virtual machine. An Ethernet port transmits the generated sub-packet over a physical link to a network switch on a network and receives that sub-packet back from the network switch over the same physical link. The processing element, in response to the sub-packet returned from the network switch, identifies the data unit from which the sub-packet was generated and forwards the identified data unit to the destination virtual machine.

In yet another aspect, the invention features a network switch comprising a physical port in communication with a physical network interface of a physical machine that provides a communication path between virtual machines running on the physical machine. The physical port receives a sub-packet containing a partial portion of a data unit transmitted by the physical network interface. The sub-packet includes metadata added by the physical network interface. A management module processes the metadata of the sub-packet to determine that the sub-packet is associated with a communication between virtual machines running on the physical machine. A switching fabric switches the sub-packet back to the physical port for forwarding to the physical network interface of the physical machine in response to the determination of the management module that the sub-packet is associated with an intra-hypervisor communication between virtual machines running on the physical machine.

In yet another aspect, the invention features a data center, comprising a plurality of physical machines including a source physical machine and a destination physical machine. The source physical machine issues a data unit addressed to the destination physical machine. A first network switch is in communication with the plurality of physical machines. The first network switch receives the data unit issued by the source physical machine. The first network switch transmits a partial portion of the data unit to a second network switch over a network while a majority portion of the data unit remains behind stored in memory. The first network switch receives that partial portion of the data unit back from the second network switch, identifies the data unit stored in the memory in response to the partial portion returned from the second network switch, and forwards the identified data unit to the destination physical machine.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
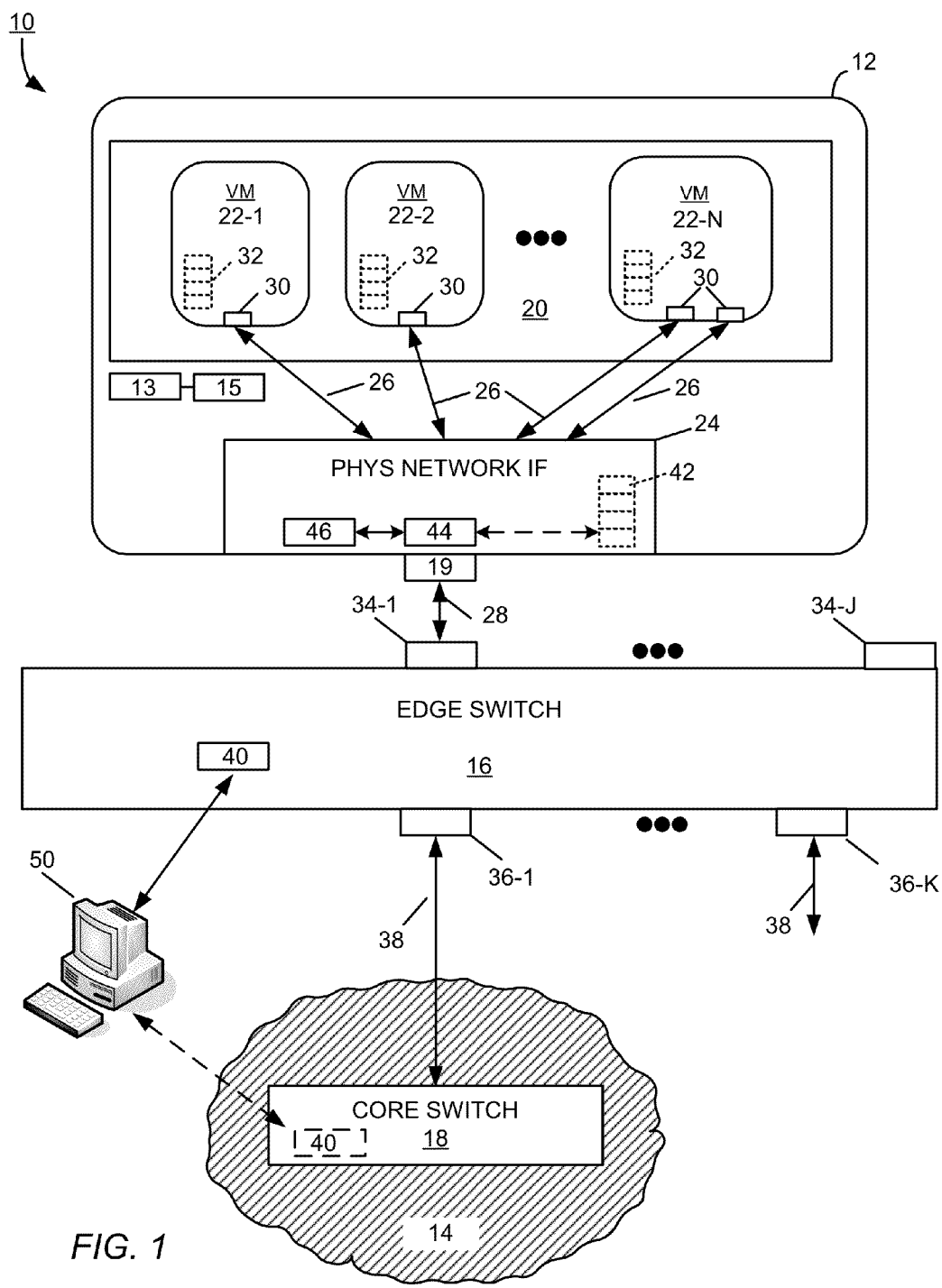
FIG. 1 is a diagram of an embodiment of a data center with a physical machine that is running a plurality of virtual machines and has a physical network interface in communication with the virtual machines and an edge switch.

Data centers described herein include one or more physical machines with a physical network interface that supports I/O virtualization. Each physical machine runs a hypervisor or VMM that instantiates one or more virtual machines on that physical machine. In the course of operation, one virtual machine, referred to as the source, issues a data unit to another virtual machine, referred to as the destination, on the same physical machine. A data unit, as used herein, generally comprises information delivered as a unit. Examples of data units include packets, frames, protocol data units (PDUs), datagrams, and cells. The terms data unit, PDU, packet, frame, datagram, cell, and traffic are used herein interchangeably, without any intention to give any particular significance to the particular term being used, unless specifically so indicated. In addition, a data unit transmitted between two VMs running on the same physical machine is referred to as an intra-hypervisor VM-to-VM communication. Such communication involves switching the data unit from the source to the destination virtual machine.

Instead of having the hypervisor or the physical network interface perform this switching, the physical machine offloads the switching to an external switch device. This offloading uses some of the bandwidth of the link between the physical machine and the external switch device. To reduce this bandwidth usage, the physical network interface of the physical machine transmits a partial portion (i.e., less than the whole) of the data unit to the external switch device, while a majority portion (i.e., more than half) of the data unit remains at the physical machine, buffered either in memory of the physical network interface or in system memory allocated to the source virtual machine. Multicast and broadcast packets are exceptions; for such intra-hypervisor VM-to-VM communications, the physical network interface transmits the entire packet to the external switch device for processing and switching.

Before sending the partial portion to the external switch device, the physical I/O device attaches metadata to it. The combination of the metadata and partial portion produces a new data unit, referred to herein as a sub-packet, of lesser size than the original data unit. The lesser size of the sub-packet results in the use of less bandwidth of the link between the physical network interface and the external switch device than would otherwise be used to forward and return the original data unit. The sub-packet can contain one or more headers from the original data unit, and a metadata header that contains out-of band information specific to a protocol implemented by the physical network interface and external switch device for handling such sub-packets.

After receiving a sub-packet, the external switch device can perform one or more switching functions based on the contents of the sub-packet. Such switching functions include, for example, traffic shaping, IGMP (Internet Group Management Protocol] snooping, and statistics gathering. Afterwards, the external switch device forwards the sub-packet back to the physical network interface through the same port and over the same physical link by which the sub-packet arrived. After receiving the returned sub-packet, the physical network interface identifies, acquires, and forwards the corresponding original data unit buffered in memory to the destination virtual machine.

FIG. 1 shows an embodiment of an oversimplified data center 10 including a physical machine 12 in communication with a network 14 through an edge switch 16. In general, a data center is a location that serves as a computational, storage, and networking center of an organization. The equipment of a data center can reside together locally at a single site or distributed over two or more separate sites. Typically, the data center 10 includes more physical machines and more edge switches than the one physical machine 12 and one edge switch 16 shown. In addition, although not shown, the data center 10 can have aggregator and gateway switches interposed between the edge switch 16 and the network 14. Moreover, such aggregator and gateway switches, and the edge switch 16, can be considered part of the network 14.

The network 14 with which the physical machine 12 is in communication can be, for example, an intranet, an extranet, the Internet, a local area network (LAN), wide area network (WAN), or a metropolitan area network (MAN), or any combination thereof. Here, the network 14 includes a core switch 18 with which the edge switch 16 is in communication.

The physical machine 12 is an embodiment of a physical computing device, such as a server or server blade, and includes hardware such as one or more processors 13, system memory 15, one or more physical I/O ports 19, a physical network interface 24. Virtualization software runs on the physical machine 12. The virtualization software includes hypervisor software 20 for abstracting the hardware of the physical machine 12 into virtual machines 22-1, 22-2, 22-N (generally, 22). The physical machine 12 can reside alone or be installed together within a chassis, for example, as in a rack server or in a blade server, and the edge switch 16 can reside alone or be installed within the same equipment chassis as the physical machine 12.

Each virtual machine 22 includes at least one application (e.g., a database application) executing within its own guest operating system. Generally, any type of application can execute on a virtual machine. One or more virtual interfaces (VIF) 30, such as a virtual NIC, is associated with each virtual machine 22. Each VIF 30 has its own unique virtual MAC address (vMAC). For example, virtual machines 22-1, 22-2 both have one VIF 30, and virtual machine 22-N has two VIFs 30. VIFs 30 include those that handle data networking communications and storage communications. Through the hypervisor 20, the VIFs 30 are logically connected to the physical network interface 24, as signified by virtual links 26. The virtual links 26 can be implemented in software (as vswitches) or through PCI IOV Virtual functions. In addition, each virtual machine 22 is allocated system memory 32 from the system memory 15 of the physical machine 12.

An example of virtualization software for implementing virtual machines on a physical machine is VMware ESX Server™, produced by VMware® of Palo Alto, Calif. Other examples of virtualization software include XenSource™ produced by Citrix of Ft. Lauderdale, Fla., Hyper-V™ produced by Microsoft of Redmond, Wash., KVM produced by RedHat of Raleigh, N.C., Virtuozzo™ produced by SWsoft of Herndon, Va., and Virtual Iron produced by Virtual Iron Software of Lowell, Mass.

As used herein, a physical network interface is generally a network I/O device that provides support in hardware, software, or a combination thereof for any form of I/O virtualization. Examples of the physical network interface include, but are not limited to, SR-IOV NICs and non-SR-IOV NICs, multi-queue NICs, network interface controllers, I/O adapters, and converged network adapters. In addition to handling the network I/O to and from the edge switch 16, the physical network interface 24 provides a communication path between virtual machines 22. As described in more detail below, the capabilities of the physical network interface 24 enable the bypass of any switch software (i.e., a vswitch) within the hypervisor 20 when switching data units between virtual machines 22 on the same physical machine.

The physical network interface 24 includes a processing element 44 and a MAC address lookup table 46 for maintaining the MAC addresses of the virtual machines 22 running on the physical machine 12. The number of MAC addresses in the lookup table 46 is generally orders of magnitude smaller in the physical network interface than those tables typically maintained in a network switch; consequently, the lookup table 46 can be implemented in hardware. In one embodiment, the physical network interface 24 includes memory 42 (shown in dashes) for buffering data units received from a source virtual machine and awaiting forwarding to a destination virtual machine.

The edge switch 16 shown in FIG. 1 includes a plurality of physical downlink ports 34-1, 34-J (generally, 34) and a plurality of physical uplinks port 36-1, 36-K (generally, 36). The edge switch can have fewer or more physical downlink ports and fewer or more physical uplink ports than those shown. The physical port 19 of the physical machine 12 is directly connected to one of the downlink ports 34-1 of the edge switch 16 by a physical link 28. A 10 Gbps Ethernet link is an example implementation of the physical link 28. Uplink ports 36 serve to connect the edge switch 16, over physical uplinks 38, to the network 14 (or to aggregator and/or gateway switches). As an example, uplink port 36-1 connects the edge switch 16 to a core switch 18 on the network 14. In one embodiment, instead of switching intra-hypervisor communications at the edge switch 16, the core switch 18, can perform the switching.

In general, the edge switch 16 is a network element that switches data units between downlink 34 and uplink ports 36, and between virtual machines 22 executing on the same physical machine 12. A management module 40 configures the edge switch 16 to perform the intra-hypervisor VM-to-VM switching. An example implementation of the edge switch 16 is an Ethernet switch (e.g., a 24-port 10 Gb Ethernet switch module manufactured by Blade Network Technologies, Inc. of Santa Clara, Calif.). In one embodiment, a remote computing station 50 is in communication with the edge switch 16 to issue commands that configure the management module 40 for sub-packet switching, as described herein. In an alternative embodiment (shown in dashed lines), the remote computing station 50 can communicate instead with a management module 40 operating on the core switch 18.

Figure 2:
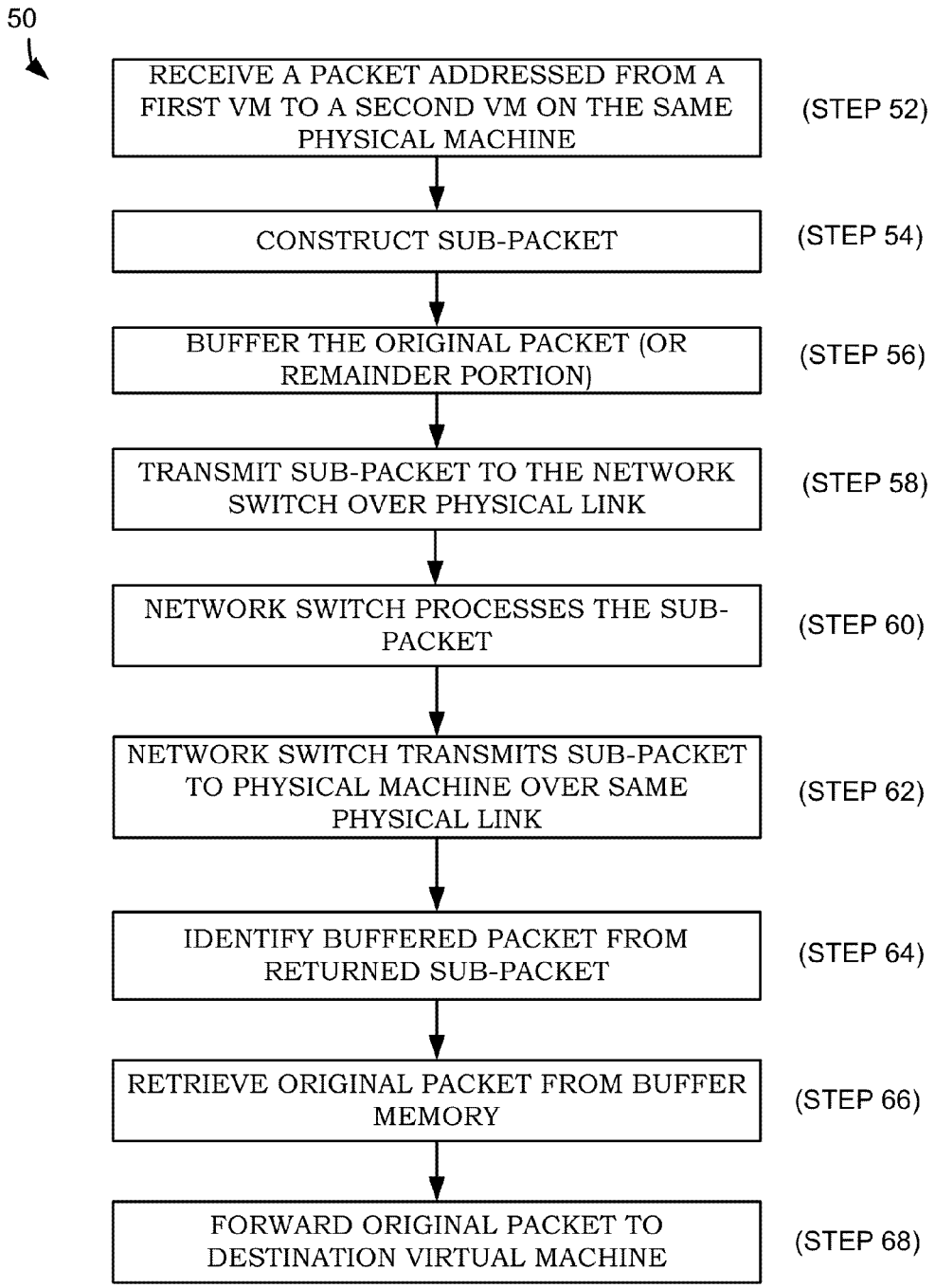
FIG. 2 is a flow diagram of an embodiment of a process for switching intra-hypervisor VM-to-VM traffic at an external switch device.

FIG. 2 shows an embodiment of a process 50 for switching data units between virtual machines running on the same physical machine. In the description of the process, reference is made to various elements described in connection with FIG. 1. The flow diagram illustrating the process is not intended to imply a particular order of steps; some of the steps can occur concurrently or in a different order from that shown.

At step 52, the physical network interface 24 receives a packet from the hypervisor 20 or directly from a virtual machine 22. One of the virtual machines (e.g., 22-1) in the hypervisor 20 is the source of the packet; another virtual machine (e.g., 22-2) in the hypervisor 20 on the same physical machine 12 is the destination. The packet, referred to hereafter as the original packet, arrives over a virtual link 26 (e.g., though a PCIe link).

To determine whether the original packet is an intra-hypervisor, VM-to-VM communication, the physical network interface 24 compares the destination MAC address with the MAC addresses in its lookup table 46. A matching address tells the physical network interface 24 to treat the arriving original packet differently from an outgoing packet targeted to a remote destination (a physical machine other than the physical machine from which the packet originates).

For an intra-hypervisor VM-to-VM communication (except for multicast and broadcast packets), the physical network interface 24 generates (step 54) a sub-packet by acquiring a partial portion of the original packet and attaching metadata to this partial portion. In one embodiment, the partial portion includes the source and destination MAC addresses associated with the source and destination virtual machines. The attached metadata conveys out-of-band information that identifies the sub-packet as a sub-packet, gives the sub-packet a unique identifier, and provides other information about the original packet, for example, the size (e.g., in bytes) of the original packet. This metadata can be prepended as header fields in front of the partial portion (as a custom header), appended as trailing fields after the partial portion, or inserted between fields of the partial portion, provided the particular location of the metadata in the resulting sub-packet is governed by a protocol followed by both the physical network interface 24 and the external switch device that switches and/or processes the sub-packet. The resulting sub-packet can be considerably smaller than the original packet; in one embodiment, the sub-packet is 256 bytes in size, whereas the average original packet is approximately 1000 bytes.

Because the physical network interface 24 forwards only the sub-packet to the edge switch 16, and not the entire original packet, buffering and aging mechanisms are needed for holding the original packet while awaiting return of the sub-packet. The amount of buffering required depends upon the anticipated roundtrip time for the sub-packet; such latency being lesser for the edge switch 16, which is just one hop away from the physical machine 12, than for the core switch 18 situated multiple hops away. Accordingly, the entire original packet (or that portion of the original packet remaining after the partial portion is acquired) is buffered (step 56) in memory. Depending upon the particular implementation, the buffering can occur within memory 42 of the physical network interface 24 or system memory 32 assigned to the source virtual machine 22-1. The physical network interface 24 maintains an association between the generated sub-packet and the original packet (e.g., an entry in a table that links the two). If a given sub-packet does not return within a predetermined period, the corresponding original packet may be aged out of the memory in which it is buffered.

The physical network interface 24 forwards (step 58) the sub-packet to the edge switch 16 over the physical link 28 through the port 19. The sub-packet arrives on the downlink port 34-1 of the edge switch 16. At step 60, the edge switch 16 processes the sub-packet, determining from the metadata that the sub-packet contains but a partial portion of an original packet. On this sub-packet, the receiving edge switch 16 can perform a gamut of switching functions based on the information included within the sub-packet (i.e., the out-of-band information, header information, or both). These switching functions can occur at any one or more layers of the Open Systems Interconnection (OSI) reference model, from Layer 2 through Layer 7, inclusive. Examples of such switching functions include, but are not limited to, ACLs (Access Control Lists), QoS (Quality of Service), traffic shaping, IGMP snooping, and statistics gathering.

After processing the sub-packet, the edge switch 16 forwards (step 62) the sub-packet to the downlink port 34-1 at which the sub-packet arrived, for subsequent transmission to the physical machine 12. The edge switch 16 may or may not add information to the sub-packet before forwarding it back to the physical network interface through the downlink port 34-1. Examples of information added to the sub-packet are commands.

In one embodiment, the edge switch 16 is not configured to process packets a described in connection with steps 60 and 62, but instead switches the packet to an uplink port 36 for forwarding the core switch 18. In this embodiment, the core switch 18 is configured to perform the aforementioned processing (i.e., identifying a sub-packet, performing one or more switching functions, and returning the packet). The core switch 18 returns the sub-packet to the same uplink port 36 of the edge switch 16, and the switching fabric 100 of the edge switch 16 returns the sub-packet to the physical machine 12.

In response to receiving the returned sub-packet (whether processed by the edge switch 16 or core switch 18), the physical network interface 24 identifies (step 64) the buffered original packet, retrieves (step 66) the original packet from buffer memory, and forwards (step 68) the original packet to the destination virtual machine.

As previously described, some of the intra-hypervisor VM-to-VM traffic can be multicast and broadcast traffic. For multicast and broadcast communications, the physical network interface 24 transmits the entire original packet to the external network switch (similar to the VEPA technique). After the entire original packet returns from the external switch device, the physical network interface forwards the packet to each destination virtual machine, as appropriate for the particular type of communication (e.g., multicast to a particular VLAN, broadcast to all virtual machines, etc.).

Figure 3:
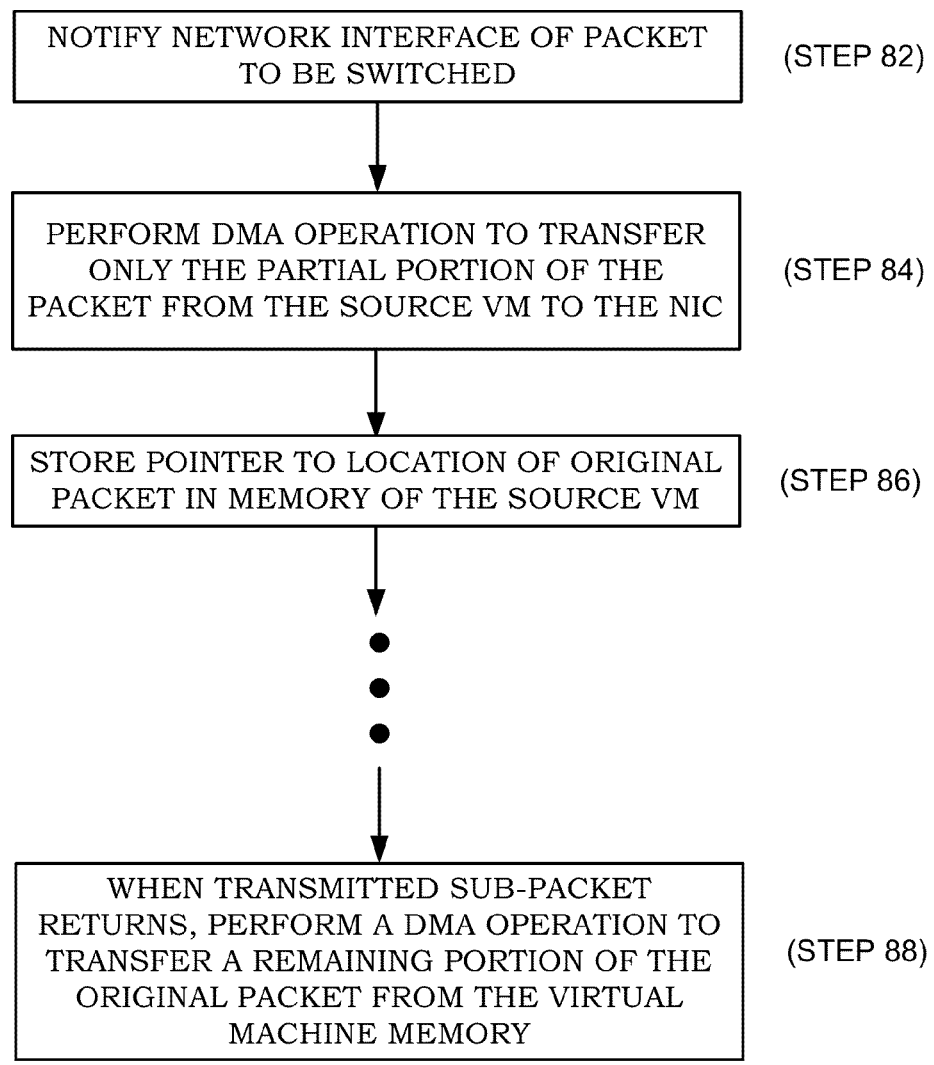
FIG. 3 is a flow diagram of an embodiment of a process for transferring in two parts the contents of a data unit from a source virtual machine to a physical network interface for subsequent forwarding to a destination virtual machine.

FIG. 3 shows an embodiment of a process 80 for moving data of a packet being sent from a source virtual machine to a destination virtual machine running on the same physical machine. In the description of the process, reference is made again to various elements described in connection with FIG. 1. At step 82, the physical network interface 24 learns of a packet issued by the source virtual machine (e.g., 22-1). In response, the physical network interface 24 initiates (step 84) a DMA (direct memory access) operation to transfer only a particular partial portion of the packet from the memory 32 of the source virtual machine 22-1. The DMA operation transfers the actual partial portion or a copy thereof to memory of the physical network interface 24, while the original packet (in whole or a remainder portion) remains buffered in the memory 32 of the source virtual machine 22-1. The physical network interface 24 constructs a sub-packet using the transferred partial portion and transmits the sub-packet to the edge switch 16, as previously described in connection with FIG. 2. The physical network interface 24 stores (step 86) pointer(s) to the location of the original packet in the memory of the source virtual machine 22-1.

After the sub-packet returns from the edge switch and the physical network interface identifies therefrom the buffered original packet, the physical network interface initiates (step 88) another DMA operation using the stored pointer(s) in step 86. This DMA operation serves to transfer the original packet (in its entirety or the remainder portion, depending on how the partial portion is acquired) from the memory 32 of the source virtual machine 22-1 into the memory of the physical network interface. The physical network interface can then forward the original packet to the destination virtual machine (e.g., 22-2).

Figure 4:
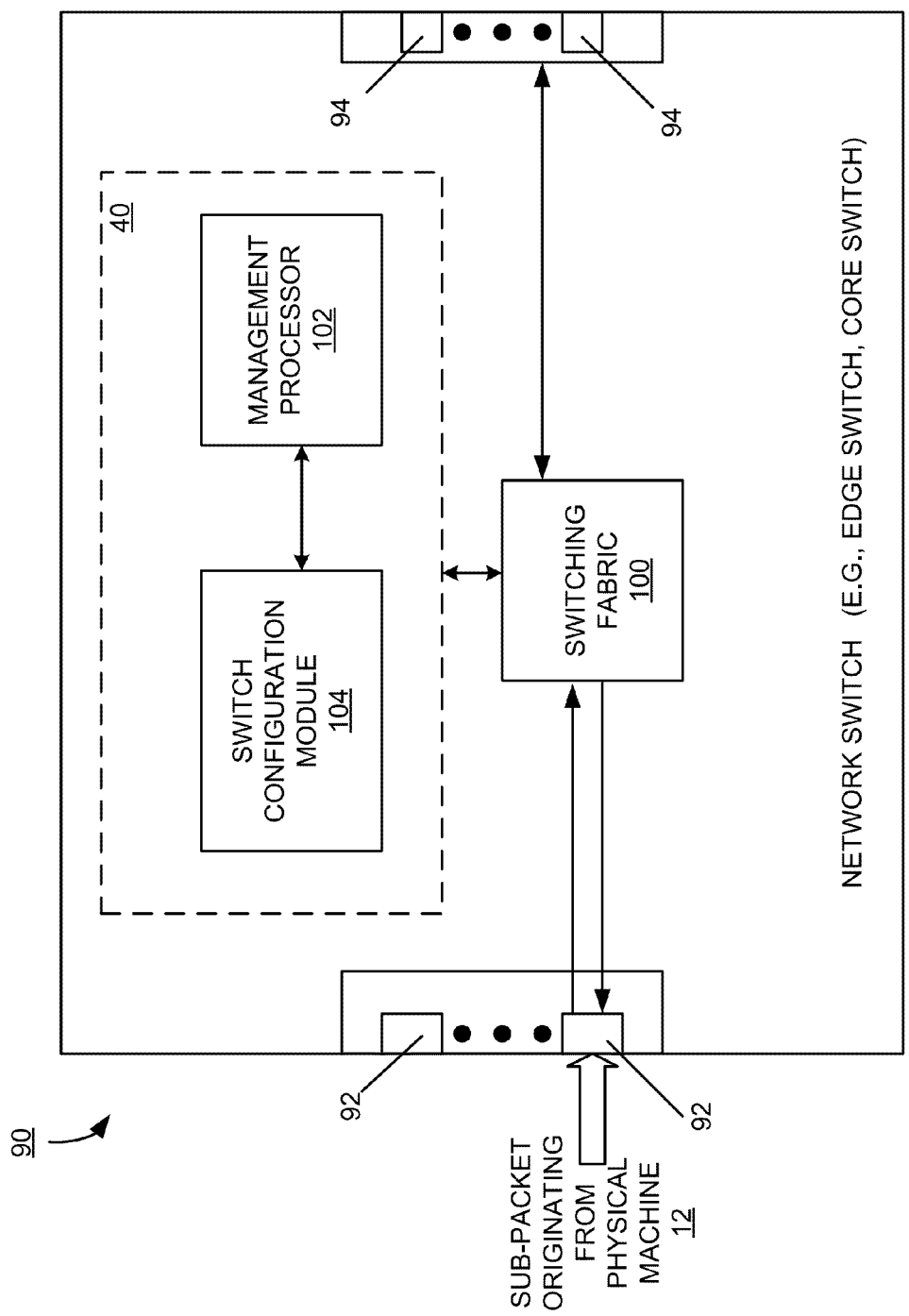
FIG. 4 is a functional block diagram of an embodiment of the network switch that switches sub-packets.

FIG. 4 shows a functional block diagram of an embodiment of a network switch 90, which can be used to implement the edge switch 16 or core switch 18. The network switch 90 includes a plurality of physical downlink ports 92, a plurality of physical uplink ports 94, and a management module 40 (FIG. 1) in communication with a switching fabric 100 for switching data units between the physical downlink and uplink ports. The management module 40 of the network switch 90 is in communication with the switching fabric 100 to affect the switching behavior of the switching fabric 100, as described herein.

The switching fabric 100 can be implemented as an OSI Layer 2 switch that applies traffic handling policies to traffic switching between physical ports. The switching fabric 100 can be embodied in a custom semiconductor integrated circuit (IC), such as an application-specific integrated circuit (ASIC), application specific standard product (ASSP), or field-programmable gate array (FPGA) semiconductor device. Although shown as separate from the switching fabric 100, the management module 40 can be implemented within the ASIC or FPGA of the switching fabric 100.

The management module 40 includes a management processor 102 that communicates with a switch configuration module 104. In one embodiment, the switch configuration module 104 is a software program executed by the management processor 102 to give the switching fabric 100 its intra-hypervisor VM-to-VM communication processing and switching functionality. Alternatively, the switch configuration module 104 may be implemented in firmware.

In brief overview, the switch configuration module 104 configures the switching fabric 100 to handle and process sub-packets associated with intra-hypervisor communications arriving from a physical machine. From the destination MAC address in an arriving sub-packet, the switching fabric 100 knows to return the sub-packet to the downlink port 92 on which the sub-packet arrived. In addition, the management module 40 uses the out-of-band information (i.e., metadata) and in-band information (e.g., packet header information) to perform one or more switching functions, as previously mentioned.

Figure 5:
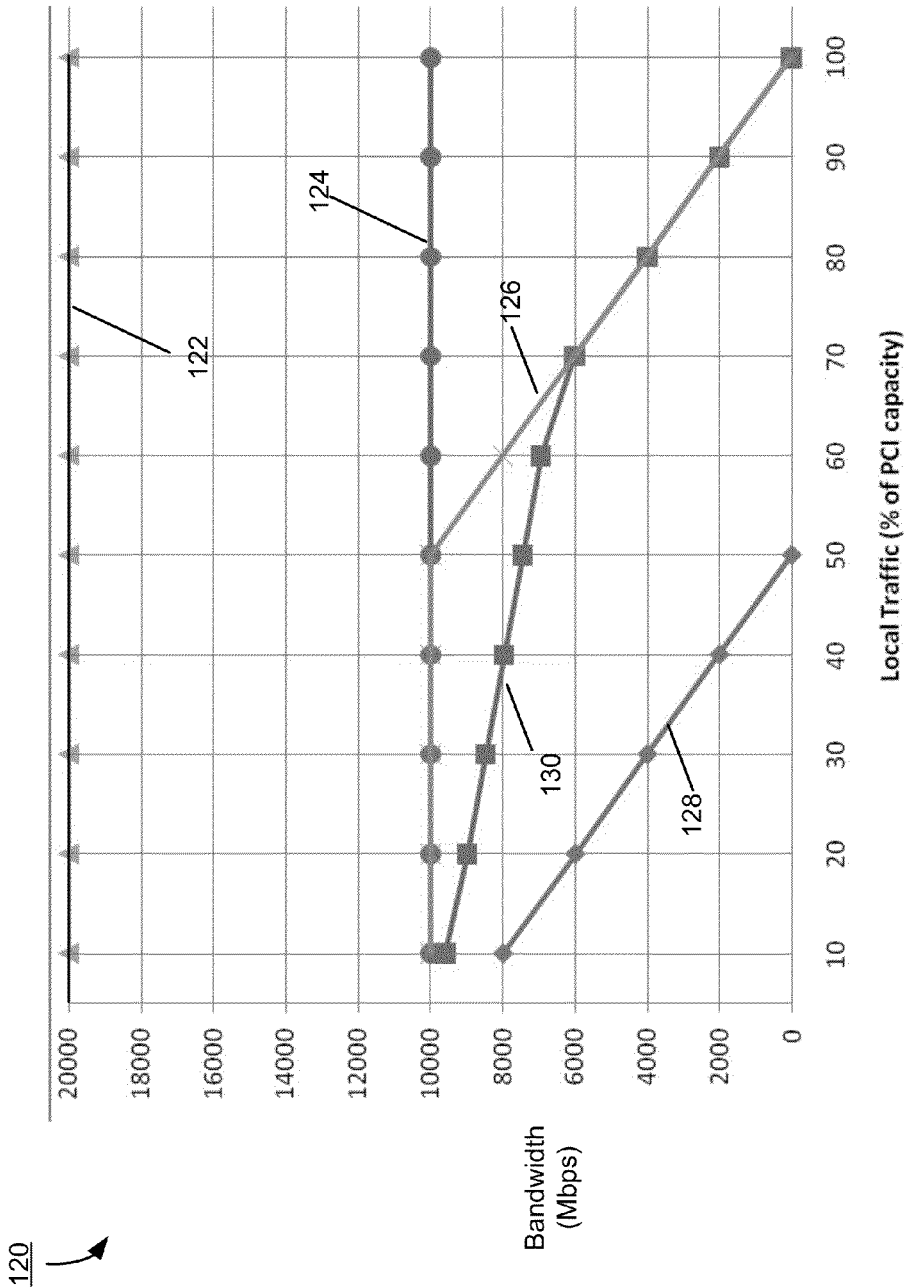
FIG. 5 is a chart comparing the amount of usable uplink bandwidth simulated to be achievable by switching sub-packets, as described herein, with those amounts achievable by the VEB and VEPA switching technologies.

FIG. 5 shows a chart 120 that simulates the amount of usable uplink bandwidth achievable by switching sub-packets, as described herein, with those amounts considered achievable by other intra-hypervisor VM-to-VM traffic switching technologies, namely VEB and VEPA. In this chart, the uplink bandwidth corresponds to an Ethernet link (e.g., link 28) between the physical network interface 24 and the edge switch 16. Bandwidth (in Mbps units) is on the y-axis of the chart, and the amount of local traffic, that is, traffic between virtual machines on the same physical machine, runs along the x-axis in units of percent (%) of PCIe link capacity.

For purposes of this comparison, the bandwidth of the Ethernet link is considered 10 Gbps, which corresponds to contemporary Ethernet technology capabilities. In addition, the PCIe link between the hypervisor and physical network interface must be of higher capacity than the Ethernet link, in order for any uplink bandwidth saved by a given intra-hypervisor switching technology to be available for carrying other than local traffic. Here, the PCIe link capacity is at 20 Gbps. Also, for purposes of this comparison, the average packet size is approximately 1000 bytes and the protocol header size is 256 bytes; thus, in this example, the bandwidth usage of the Ethernet link forwarding a partial data unit to an external network switch is approximately 25% of that for forwarding the entire packet; that is, an approximate 75% savings over transmitting the entire data unit over the Ethernet link.

Graph 122 represents the bandwidth of the PCIe link, which is constant at 20 Gbps, and graph 124 represents the bandwidth of the Ethernet link, which is constant at 10 Gbps. The graph 126 represents the amount of uplink bandwidth that the VEB technique makes available. Because the VEB switching technique switches packets at the physical network interface, the entire 10 Gbps bandwidth of the Ethernet link is available when the local traffic is in the range of 0% to 50% of the PCIe link capacity. (The graph 126 overlaps the graph 124 in the range of 0% to 50%).

When the local traffic is beyond 50%, the PCIe link capacity limits how much bandwidth of the Ethernet link can be used. For example, if local traffic is 60% of the PCIe link capacity, local traffic requires 12 Gbps of the PCIe link's bandwidth, leaving 8 Gbps of the PCIe link's bandwidth for other than local traffic. Thus, although the Ethernet link can support 10 Gbps of other traffic, the PCIe link can supply only 8 Gbps of such traffic. (For graph 126 here and graphs 128, 130 below, the amounts of consumed and available uplink bandwidth are rounded values, approximated thus for simplicity and clarity).

The graph 128 shows the amount of available Ethernet bandwidth for the VEPA switching technique as a function of the percent of local traffic on the PCIe link. For intra-hypervisor VM-to-VM traffic, the VEPA technique transmits entire packets to the external network switch; accordingly, there is a one-to-one correspondence between the PCIe link bandwidth consumed by local traffic and the bandwidth used on the Ethernet link. As an illustrative example, if local traffic is 10% of the PCIe link's 20 Gbps capacity, local traffic is using 2 Gbps. This local traffic bandwidth corresponds to the use of 2 Gbps of the Ethernet link's bandwidth, leaving 8 Gbps of its 10 Gbps capacity for other traffic. As another data point, when local traffic is 50% of the PCIe link's 20 Gbps capacity, this means that local traffic is using 10 Gbps; the VEPA technique uses 10 Gbps of the Ethernet link's bandwidth, leaving 0 Gbps of its 10 Gbps capacity for other traffic.

The graph 130 shows the amount of bandwidth of the Ethernet link that is available when switching sub-packets. When local traffic is 10% of the PCIe link's 20 Gbps capacity, switching partial data units uses 0.5 Gbps of the Ethernet link's bandwidth, leaving 9.5 Gbps of its 10 Gbps capacity for other traffic. Accordingly, the protocol for switching sub-packets saves 1.5 Gbps more of the Ethernet link bandwidth than the VEPA technique. When, for example, local traffic is 50% of the PCIe link's 20 Gbps capacity, the protocol uses 2.5 Gbps of the Ethernet link's bandwidth, leaving 7.5 Gbps of its 10 Gbps capacity for other traffic. VEPA, in comparison, leaves no Ethernet link bandwidth available for other traffic at this level of local traffic.

Hence, according to the chart 120, the protocol described herein can produce a significant savings in usable uplink (Ethernet link) bandwidth compared to the VEPA technique; and when the local traffic is greater than or equal to 70% of the PCIe link capacity, there is no difference in usable uplink (Ethernet link) bandwidth between the protocol and the VEB technique.

Figure 6:
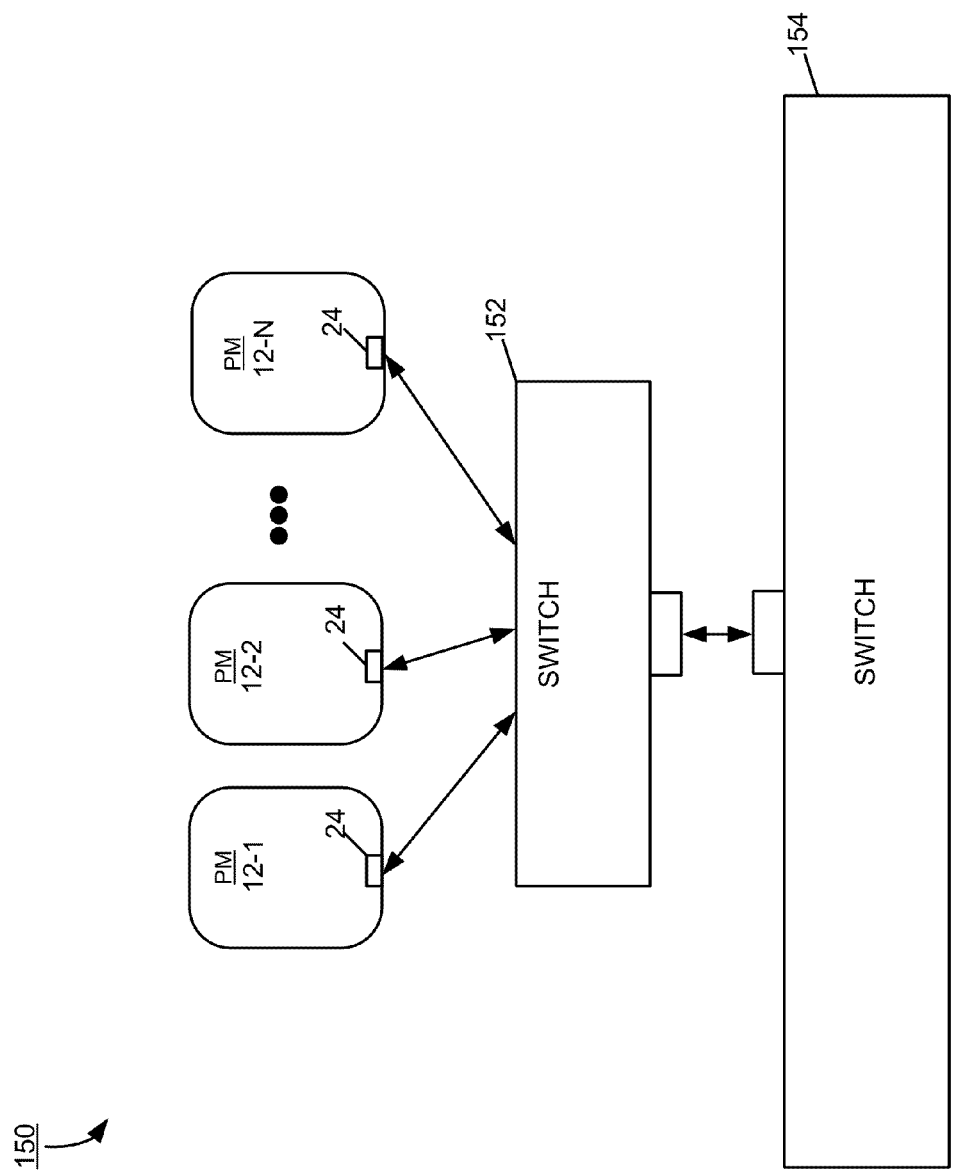
FIG. 6 is a diagram of an embodiment of a data center with a plurality of physical machines connected to a first switch that offloads packet switching to a second switch in accordance with the principles described herein.

Although described herein with respect to intra-hypervisor VM-to-VM communications, the principles of the invention can be applied generally to the switching of physical machine-to-physical machine communications. FIG. 6 shows an embodiment of a data center 150 with a plurality of physical machines 12-1, 12-2, 12-N (generally, 12) connected to a switch device 152 through respective physical network interfaces 24. The physical machines 12 may or may not be running virtual machines.

During operation, a source physical machine (e.g., 12-1) issues a data unit addressed to a destination physical machine (e.g., 12-2). Conventionally, the switch device 152 receives the data unit from the source physical machine 12-1 and forwards the data unit to the destination physical machine 12-2. Instead of performing this switching, the switch 152 offloads the switching to another switch device 154 in accordance with the principles described herein. More specifically, the switch 152 transmits a sub-packet (containing a partial portion of the data unit and metadata) to the second switch device 154, while a majority portion (i.e., more than half) of the data unit remains either at the source physical machine 12-1 or at the first switch device 152.

After receiving a sub-packet, the second switch device 154 can perform one or more switching functions based on the contents of the sub-packet, and forward the sub-packet back to the first switch 152. After receiving the returned sub-packet, the first switch 152 identifies, acquires, and forwards the corresponding original data unit buffered in memory to the destination physical machine 12-2.

Embodiments of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher-level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

While the invention has been shown and described with reference to specific preferred embodiments, it should be understood by those skilled in the art that various changes in form and detail may be made therein without departing from the spirit and scope of the invention as defined by the following claims.

What is claimed is:

1. A data center, comprising:
a physical machine running a plurality of virtual machines including a source virtual machine and a destination virtual machine,
the physical machine having a physical network interface in communication with the plurality of virtual machines and with a network,
the source virtual machine issuing a data unit addressed to the destination virtual machine,
the physical network interface transmitting a partial portion of the data unit over the network while a majority portion of the data unit remains stored in memory at the physical machine if the data unit is a unicast data unit, and transmitting the entire data unit over the network if the data unit is a multicast or broadcast data unit; and
a network switch on the network, the network switch having a physical port receiving the partial portion of the data unit or the entire data unit transmitted by the physical network interface, the network switch returning the partial portion of the data unit or the entire data unit to the physical network interface through the same physical port,
wherein the physical network interface identifies the data unit stored in the memory in response to the partial portion returned from the network switch and forwards the identified data unit to the destination virtual machine.

2. The data center of claim 1, wherein the physical network interface includes the memory in which the majority portion of the data unit is stored while the partial portion of the data unit is forwarded over the network.

3. The data center of claim 1, wherein the memory in which the majority portion of the data unit is stored comprises system memory of the physical machine allocated to the source virtual machine.

4. The data center of claim 1, wherein the physical network interface adds metadata to the partial portion of the data unit before forwarding the partial portion of data unit over the network.

5. The data center of claim 1, wherein the network switch is an edge switch connected by a physical link to the physical machine.

6. The data center of claim 1, wherein the network switch is a core switch in communication with the physical machine through one or more intermediate network switches.

7. A physical network interface, comprising:
- a PCI (Peripheral Component Interconnect) port for receiving a data unit addressed by a source virtual machine on a physical machine to a destination virtual machine on the same physical machine;
- a processing element generating a sub-packet containing a partial portion of the data unit addressed by the source virtual machine to the destination virtual machine if the data unit is a unicast data unit; and
- an Ethernet port transmitting the generated sub-packet, or the entire data unit if the data unit is a multicast or broadcast data unit, over a physical link to a network switch on a network and receiving the sub-packet or the entire data unit back from the network switch over the same physical link,
- wherein the processing element, in response to the sub-packet returned from the network switch, identifies the data unit from which the sub-packet was generated and forwards the identified data unit to the destination virtual machine.

8. The physical network interface of claim 7, wherein the processing element adds metadata to the partial portion of the data unit to generate the sub-packet before the sub-packet is transmitted to the network switch.

9. The physical network interface of claim 7, wherein, if the data unit is a unicast data unit, the physical network interface:
- initiates a DMA operation to acquire only the partial portion of the data unit from system memory of the physical machine allocated to the source virtual machine, thereby leaving a majority portion of the data unit within the system memory; and
- initiates another DMA operation to acquire the majority portion of the data unit from the system memory after the transmitted sub-packet returns from the network switch.

10. The physical network interface of claim 7, further comprising buffer memory for storing a majority portion of the data unit while waiting for the sub-packet to return from the network switch if the data unit is a unicast data unit.

11. The physical network interface of claim 7, further comprising a MAC (media access control) address lookup table for maintaining addresses of virtual machines running on the physical machine and for determining whether the data unit from the source virtual address is an intra-hypervisor virtual machine-to-virtual machine communication.

12. A network switch, comprising:
- a physical port in communication with a physical network interface of a physical machine,
- the physical port providing a communication path between virtual machines running on the physical machine,
- the physical port receiving a sub-packet from the physical network interface, the sub-packet containing a partial portion of a data unit if the data unit is a unicast data unit, the sub-packet including metadata added by the physical network interface, and receiving the entire data unit from the physical network interface if the data unit is a multicast or broadcast data unit;
- a processor receiving and processing the metadata of the sub-packet to determine that the sub-packet is associated with a communication between virtual machines running on the physical machine; and
- a switching fabric switching the sub-packet back to the physical port for forwarding to the physical network interface of the physical machine in response to the determination of the processor that the sub-packet is associated with a communication between virtual machines running on the physical machine, and switching the entire data unit back to the physical port for forwarding to the physical network interface when the data unit is a multicast or broadcast data unit.

13. The network switch of claim 12, wherein the processor performs one or more OSI Layer 2 through Layer 7 switching functions in response to the sub-packet received on the physical port.

14. The network switch of claim 12, wherein the physical port is connected directly by a physical link to the physical machine.

15. The network switch of claim 12, wherein the physical port is in communication with the physical machine through one or more intermediate network switches.

* * * * *